Patented July 24, 1928.

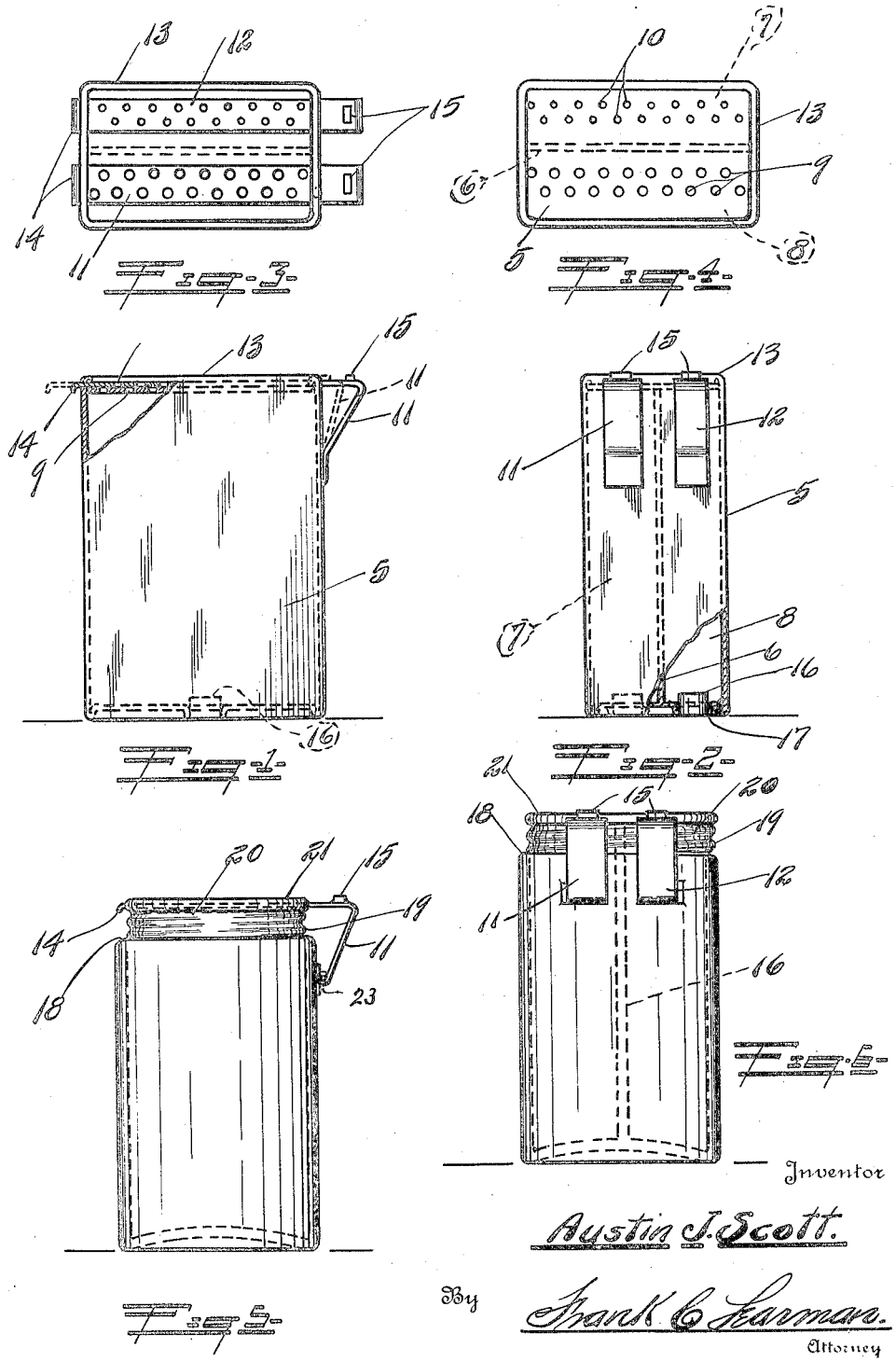

1,678,487

UNITED STATES PATENT OFFICE.

AUSTIN J. SCOTT, OF GLADWIN, MICHIGAN.

COMBINATION SALT AND PEPPER SHAKER.

Application filed April 4, 1927. Serial No. 180,682.

This invention relates to combination shakers, and particularly to a salt and pepper shaker made of aluminum, glass, or any other suitable material.

The prime object of the invention is to design a combination salt and pepper shaker in which the salt and pepper are introduced into individual compartments, and delivered through a perforated cap covered by a pair of resilient perforated strips normally out of alinement with, and covering the perforations in the cap.

A further object is to design a combination salt and pepper shaker, from which either salt or pepper can be selectively delivered, or from which both salt and pepper can be simultaneously delivered.

With the above and other objects in view, the present invention consists in the combination and arrangement of parts, hereinafter more fully described, illustrated in the accompanying drawing and particularly pointed out in the appended claim, it being understood that changes may be made in the form, size, proportion and minor details of construction, without departing from the spirit, or sacrificing any of the advantages of the invention.

In the drawing.

Fig. 1 is a part sectional front elevation of my improved shaker.

Fig. 2 is a side view thereof.

Fig. 3 is a top plan view.

Fig. 4 is a similar view with the resilient strips omitted.

Fig. 5 is a front view of a glass shaker.

Fig. 6 is a side view thereof.

Referring now particularly to the drawing in which I have shown the preferred embodiment of my invention, the numeral 5 indicates a metal container or shaker, having a division plate 6 fixed therein for dividing the container into two individual compartments 7 and 8 respectively, one for salt and the other for pepper.

The upper end or top of the container is perforated as clearly shown in Fig. 4 of the drawing, the larger perforations 9 communicating with the salt compartment, the smaller perforation 10 communicating with the pepper compartment, these are arranged in rows as shown, and are adapted to be covered by a pair of resilient strips 11 and 12 respectively, each strip having openings of the same size as those on the top of the container, and with which they register when the strips are moved to position as hereinafter described.

A raised bead 13 is provided on the upper end of the container, and suitable openings are provided through said bead to accommodate said strips, and are of a size to permit the strips to slide therein, the ends of the strips being bent as shown at 14, and serves as a stop, the opposite end projecting beyond the container, being bent downwardly and inwardly, and is secured to the side of the container by solder, riveting, or in any approved manner, the perforations in said strips being spaced so that when in position as shown in full lines in Fig. 1 of the drawing, the openings in the top of the container will be covered and no salt or pepper can be delivered, but when the strips are forced inwardly to position as shown in dotted lines in Fig. 1 of the drawing, the perforations in the strips will register with the perforations in the top of the container, and salt and pepper can be delivered.

A boss 15 is provided on each strip in the position as shown, and acts as a stop to limit the inward movement of the strips, so that the user cannot force the strips too far, and the openings in the stop beyond the point of register with the openings in the container, and again cover the perforations in the top, when he is desirous of delivering salt or pepper or both from the shaker.

The container is filled from the bottom and corks 16 are provided and form stoppers for the openings 17 provided in each compartment.

In Figs. 5 and 6 of the drawing, I have shown a glass container, the neck 18 of which is reduced and threaded as shown at 19 to receive a metal cap or cover 20, a raised bead 21 similar to that shown on the metal container being provided on this cover, and the strips are mounted in identically the same manner, excepting the one end of the strip is not secured to, but rests against the side wall of the container, small bosses 23 being provided on the side wall, and serve to engage the ends of the strips to hold the cover in proper position, this container is filled from the top as the cover can be readily removed.

From the foregoing description it will be obvious that I have perfected a very simple, inexpensive and convenient combination salt and pepper shaker.

What I claim is:—

A combination salt and pepper shaker, comprising a receptacle formed with individual compartments, a raised bead on the top of said receptacle, perforations in said top, a pair of resilient strips mounted on said top and covering said perforations, and slidably mounted in openings in the raised bead, one end of each strip being turned to form a stop, the opposite end projecting beyond the top and extending downwardly at an angle, to engage the side of the receptacle, stops formed on said strips and spaced from the bead, perforations on the strips and adapted to register with the perforations in the top when the strips are forced inwardly and the stops engage the bead on the top, and means for securing said strips in position.

In testimony whereof I hereunto affix my signature.

AUSTIN J. SCOTT.